United States Patent [19]
Suzuki et al.

[11] 3,854,985
[45] Dec. 17, 1974

[54] METHOD FOR APPLYING MASTIC PAINT COMPOSITIONS TO CONCRETE BASES

[75] Inventors: Yoshinori Suzuki; Yukio Iwasaki, both of Tokyo, Japan

[73] Assignee: Kowa Chemical Industry Ltd., Tokyo, Japan

[22] Filed: June 9, 1972

[21] Appl. No.: 261,297

[52] U.S. Cl................ 117/11 D, 52/515, 106/90, 106/93, 106/95, 106/97, 117/111 R, 117/123 A, 117/169 A, 260/17 R
[51] Int. Cl................ B44d 1/02, C04b 7/02
[58] Field of Search ...... 106/90, 93, 95; 117/111 R, 117/111 D, 125 A, 169 A, 111 A; 52/515

[56] References Cited
UNITED STATES PATENTS

| | | | |
|---|---|---|---|
| 2,892,728 | 6/1959 | Jolly.................... | 106/90 |
| 2,959,489 | 11/1960 | Wagner................. | 106/90 |
| 3,030,258 | 4/1962 | Wagner................. | 106/93 |
| 3,051,590 | 8/1962 | Proux.................... | 117/123 A |
| 3,169,877 | 2/1965 | Bartoli.................. | 106/93 |
| 3,487,038 | 12/1969 | Toy et al............... | 106/90 |
| 3,538,036 | 11/1970 | Peters et al........... | 106/90 |
| 3,663,287 | 5/1972 | Mizunnma............. | 106/93 |

FOREIGN PATENTS OR APPLICATIONS

| | | | |
|---|---|---|---|
| 628,553 | 6/1963 | Belgium................ | 106/90 |

OTHER PUBLICATIONS

Chemical Abstracts, Vol. 70: 80587e, 1969.
Chemical Abstracts, Vol. 58: 9946a, 1963.

*Primary Examiner*—William D. Martin
*Assistant Examiner*—William H. Schmidt
*Attorney, Agent, or Firm*—McGlew and Tuttle

[57] ABSTRACT

A mastic paint composition for concrete is prepared by adding to a mixture of Portland cement with aggregates the following: calcium chloride, naphthalene sulfonic acid formalin condensate, alkyl cellulose, propylene glycol and known additives, such as calcium sulfoaluminate as an antishrinking agent, zeolite as an efflorescence preventing agent, calcium stearate as a waterproofing agent and tributyl phosphate as a defoaming agent as well as coloring agents. A rubber latex or an emulsion of a vinyl resin may also be added. This paint composition is made by kneading these components with addition of water into a paste. In applying this paste to a concrete base, there is no need of treating the surface of the base beforehand, but the paste can be applied with a porous hand-roller directly to the untreated concrete base, and a mastic finish can be obtained in one shot.

10 Claims, No Drawings

METHOD FOR APPLYING MASTIC PAINT COMPOSITIONS TO CONCRETE BASES

SUMMARY OF THE INVENTION

The present invention relates to a paint composition and a method of applying this paint composition to a concrete base. More particularly, the invention relates to a paint composition which can be applied directly to an untreated base, and a method for applying the paint composition to the base.

BACKGROUND OF THE INVENTION AND PRIOR ART

Among the methods for applying paint to a concrete base, brush-coating and spray-gun coating methods are well-known. Before paint is applied to a concrete base with a brush, usually the surface of the base is polished by a grinder in order to remove the unevenness or irregularities on the base's surface, and then the base is coated with mortar or putty, and furthr smoothed away by sand paper, and treated with a sealer primer. Then under coating, second coating and finishing coating are applied to the pretreated surface of the base by brush. In case a spray gun is used, the surface of the base is tidied up and the unevenness and irregularities are removed; pin holes are plugged up, and a sealer primer is applied to the surface of the base before under spraying and finishing spraying of the paint are carried out with the spray gun.

However, the known methods of coating concrete involve a number of complicated processes, and much time and labor are required for their practice. Especially when hydraulic cement is sprayed by a spray gun at a low temperature, as is usually the case in giving a scratching finish of stucco, efflorescence is apt to take place, for which there is no remedy. What is worse, a considerable skill is required for spraying paint with a spray gun, accompanied by not a little material loss. If hanging-type scaffolds are constructed for the paint-spraying of a building, instead of expensive proper scaffolding, operational difficulty is increased, and the paint tends to be applied unevenly.

Many studies have been made for the purpose of overcoming the disadvantages involved in the known methods, but no satisfactory solution has been obtained as yet.

OBJECTS OF THE INVENTION

An object of the invention is to provide novel paint compositions which can be applied directly to concrete bases without subjecting the bases to any pretreatment. Another object is to provide a method for applying said compositions to these bases.

Still another object of the invention is to provide a method for carrying out the application of the paint compositions in one shot to give thick films thereof, which films then need to be coated only with a protective material as the finish coat.

Yet another object of the invention is to provide paint compositions which are of the room temperature drying type, which have a short curing time, and which can not crack or fall off after applied.

One more object of the present invention is to give coated surfaces for indoor or outdoor use, which exhibit superior resistance to fading and weathering, which present a glossy, ceramic appearance like that of tiles, and which give no pain to human bodies coming into contact with them. Moreover, it is an object to provide such coated surfaces which are washable with water while their color hardly changes or fades with the lapse of time.

DESCRIPTION OF THE INVENTION

The paint composition employed in practicing the method of the invention is prepared by adding to a mixture of Portland cement and an aggregate, the following: 1–3 parts of calcium chloride, 0.4–2 parts of naphthalene sulfonic acid formalin condensate, 1–2 parts of alkyl cellulose, and 2–5 parts of propylene glycol, all of said parts being per 100 parts of the Portland cement. Further, the following are added to the mixture: an antishrinking agent, an efflorescence preventive agent, a waterproofing agent, a defoaming agent, a coloring agent, and water, then the resulting mixture is processed into a paste. The paste is applied by means of a porous hand roller to the surfaces of a concrete base, thereby carrying out a mastic coating, along with the treatment of the base, in a one coat finish.

Calcium chloride added to the composition serves as a cure modifier, its amount being 1–3 parts per 100 parts of the cement. The amounts of naphthalene sulfonic acid formalin condensate, alkyl cellulose, and propylene glycol are suitably in the ranges of 0.4–2 parts, 1–2 parts, and 2–5 parts, respectively, and if they are more or less than what are given above, desired results can hardly be obtained. As the alkyl cellulose, either methyl cellulose or ethyl cellulose is used, having a high gel point, preferably above 90°C. As the naphthalene sulfonic acid formalin condensate, the sodium salt of α-methyl naphthalene sulfonic acid formalin condensate is used. To the mixture 0.5–10 parts of calcium sulfoaluminate may be added as an antishrinking agent, 5–15 parts of zeolite as an efflorescence preventive agent, 0.1–5 parts of calcium stearate may be added as a waterproofing agent, and 0.01–0.2 part of tributyl phosphate may be added as a defoaming agent, as well as a coloring agent in such an amount as to meet the purpose for which it is employed.

If a synthetic rubber latex such as styrene-butadiene rubber or a vinyl resin emulsion such as acrylic ester copolymer is added to the above-given mixture, a film of more uniform quality will be produced, and the bond between the finishing coat and the film formed of the paint composition of the present invention will be strengthened. Further, if vinyl paint or acrylic acid paint is applied to the above-given composition-coated base to give a protective layer of a synthetic resin, a still more beautiful decorative layer will be formed.

The method of the present invention is quite different from an ordinary roller painting method which comprises applying a paint composition, containing finely divided white lime stone with a brush roller only to the surfaces of a porous base.

The method of the invention is also different from a roller application of a sandtextured coating, in which the aggregates mixed in the composition are apt to get together or fly about, causing a big loss, which is liable to end in uneven finish.

In order to achieve a satisfctory mastic coating, it is usually required to have the paint composition applied several times, so that the coating layers become thick and tend to crack during drying.

The method of the present invention is quite free from the disadvantages which are observed in the conventional methods, and can be easily practiced by means of a porous hand-roller with which the paint composition of the invention is pressure-transferred over a base at the rate of from 1.3 to 2.4 kg/m$^2$, so that it requires no special skill.

The work efficiency obtained by the method of the invention in comparison with that given by the known methods of scratching a hydraulic cement and spraying a sand-textured paint composition is given in Table 1 which follows.

adhesion and water resistance as well as beautiful appearance of the patterns as a finish.

The method of the present invention is best used in the coating of inorganic materials for indoor or outdoor use. The films formed, after being allowed to stand for 28 days, have surfaces exhibiting glassy unevenness like that of ceramic tiles and such films serve the purpose of decorative coating, which covers any irregularities and pinholes on the surfaces of the base.

The maximum thickness of the film prepared with the paint composition of the invention is from 2 to 3 mm, and its properties are given in Table 2 which follows.

Table 2

| Item | Results of the test | Testing method or kind of standard employed |
|---|---|---|
| 1. Processability | Good | A porous hand roller was employed in conducting the test. |
| 2. Condition of coating film | Good | Uniformity and stability of the patterns presented by the film and uniformity of its color. |
| 3. Impact resistance (on 28 day-old film) | No change at 1 kg × 75 cm | JIS-A-5403 |
| 4. Adhesion (Under normal condition) | More than 3 kg/cm$^2$ | An adhesion tester kept at the Architectural Research Institute of the Ministry of Construction was employed in conducting the test. |
| 5. Abrasion test (on 28 day-old film) | 95 mg/1,000 times | Taber's abrasion tester. (Abraser: H 22, load: 250 g) |
| 6. Washability | No change after being washed 2,000 times. | JIS-A 6909 |
| 7. Degree of luster | More than 70 | JIS-K 5400 |
| 8. Freeze thaw stability | No change after 20 cycles. | In accordance with ASTM C-290-61T |
| 9. Water penetration (on 28 day-old film) | Quantity of water penetrated: None | JIS-A 6101 Water pressure: 0.1 kg/cm$^2$. |
| 10. Accelerated weathering | No change after 1,000 hours | Irradiation by a weathermeter |

Table 1

| Method | Number of coats | Amount of paint used (kg/m$^2$) | Amount of paint coated (kg/m$^2$) | Work efficiency (m$^2$/man-day) |
|---|---|---|---|---|
| Method of present invention | 1 | 1.3–1.8 | 1.2–1.7 | 60–70 |
| Scratching of a hydraulic cement | 2 | 1.2–1.3 | 0.8–1.0 | 60 |
| Spraying of a sand-textured paint composition | 2 | 0.7–1.7 | 0.5–1.2 | 45 |

The surfaces of the scratching-finished concrete base usually become dirtier with the passage of time, whereas the surfaces of the concrete base treated by the method of the invention, according to experience, were only a little contaminated even after the lapse of 2 years and 6 months; the contamination could be removed by washing with water.

Generally, coating conditions differ somewhat depending on whether the coat is applied, for example, to walls or to ceilings of a room, either indoors or outdoors.

What is particularly required of outdoor coating is weather resistance, water resistance, adhesion, cleanliness, and rigidity; while as to indoor coating, what is required of the wall coating is adhesion, water resistance and rigidity, and what is required of ceiling coating is

DESCRIPTION OF SPECIFIC EMBODIMENTS

The invention will be further illustrated by the following examples.

EXAMPLE 1.

65 parts of water were added to 100 parts of the powdery paint composition consisting of the ingredients stated below in Table 3, and the resultant mixture was kneaded into a paste, which was then applied at a rate of 1.8 kg/m$^2$ to surfaces of a 315 m$^2$ indoor concrete wall of a ply-wood form. After the lapse of 24 hours (temperature: 20°C, relative humidity: 65 percent), a 25 percent toluol solution of an acrylic ester copolymer was applied at the rate of 0.45 kg/m$^2$ of the so prepared paint composition. As a result, a glassy uneven finish was given like the one given by ceramic tiles, covering the irregularities of 2–3 mm and pinholes on the surface of the base. No crack or peeling off of the covering paint was observed. The work efficiency was 65 m²/man-day. The adhesion of the film to the base was measured at 10 kg/cm² under normal conditions after the film had been allowed to stand for 28 days. The film was 3.0 mm thick and not permeable to water.

Table 3

Ingredients of the paint composition of Example 1

| Item | Kind | % by weight |
|---|---|---|
| Cement | Hydraulic white Portland cement | 100 |
| Aggregate | Silica sand (100–200 mesh) | 100 |
| Pigment | Anatase titanium dioxide | 10 |
| Additives | Zeolite (efflorescence preventive agent) | 10 |
| | Calcium chloride | 3.0 |
| | Naphthalene sulfonic acid formalin condensate | 1.2 |
| | Calcium stearate | 0.5 |
| | Calcium sulfoaluminate (anti-shrinking agent) | 1.0 |
| | Methylcellulose (4000 cp) | 1.0 |
| | Tributyl phosphate | 0.1 |
| | Propylene glycol | 2.0 |

EXAMPLE 2.

To 100 parts of the powdery paint composition consisting of the ingredients stated below in Table 4 were added 70 parts of water and 20 parts of 46 percent acrylic ester copolymer emulsion. The mixture was kneaded into a paste. The paste was applied at a rate of 2.0 kg/m² to 101 m² outdoor concrete wall of a metal form which had not been pretreated. After the lapse of 24 hours, (temperature: 20°C, relative humidity: 65 percent), white enamel (solid content: 40 percent) in a toluol solution of an acrylic ester copolymer was applied to the film prepared of the paint composition at the rate of 0.4 kg/m². As a result, glassy unevenness like the one given by ceramic tiles, was given covering the pinholes on the surface of the concrete base. No crack or peeling off of the coating paint was observed. The work efficiency was 70 m²/man-day. The film of the so-prepared paint composition was observed to possess properties similar to those shown in Example 1. The addition of the polymer emulsion to the paint composition proved to help produce a film of uniform quality and improve the adhesion of the film to the finishing material.

Table 4

Ingredients of the paint composition of Example 2

| Item | Kind | % by weight |
|---|---|---|
| Cement | Hydraulic white Portland cement | 100 |
| Aggregate | Silica sand (100–200 mesh) | 150 |
| Pigment | Anatase titanium dioxide | 10 |
| Additives | Zeolite | 12 |
| | Calcium chloride | 2.0 |
| | Naphthalene sulfonic acid formalin condensate | 1.5 |
| | Calcium stearate | 0.5 |
| | Calcium sulfoaluminate | 1.2 |
| | Methylcellulose (4000 cp) | 1.5 |
| | Tributyl phosphate | 0.1 |
| | Propylene glycol | 4.0 |

What is claimed is:

1. Method for applying a mastic coating to a concrete base which comprises applying to said concrete base, with a porous hand roller in a one coat finish, a pasty paint composition comprising a mixture of (a) Portland cement, (b) an aggregate, (c) from about 1 to about 3 parts by weight of calcium chloride, (d) from about 0.4 to about 2 parts by weight of naphthalene sulfonic acid formalin condensate, (e) from about 1 to about 2 parts by weight of alkyl cellulose having a viscosity of about 4,000 cps, (f) from about 2 to about 5 parts by weight of propylene glycol, (g) from about 0.5 to about 10 parts by weight of calcium sulfoaluminate, (h) from about 5 to about 15 parts by weight of an efflorescence preventing agent consisting essentially of zeolite, (i) from about 0.1 to about 5 parts by weight of calcium stearate, and (j) from about 0.01 to about 0.2 part by weight of tributyl phosphate, all of said parts being based upon 100 parts of said Portland cement, and said aggregate being present in an amount of from about 100 to about 150 parts by weight.

2. The method claimed in claim 1 in which a synthetic rubber latex is added to the pasty paint composition.

3. The method of claim 2, in which styrene-butadiene rubber latex is added to the pasty paint composition.

4. The method claimed in claim 1 in which a vinyl resin emulsion is added to the pasty paint composition.

5. The method of claim 4, in which acrylic ester copolymer is added in the form of an emulsion to the pasty paint composition.

6. The method of claim 1, wherein the aggregate is silica sand.

7. The method of claim 6, wherein the alkylcellulose is methyl cellulose.

8. Method for applying a mastic coating to a concrete base which comprises applying to said base, with a porous hand roller in a one-coat finish, a pasty paint composition comprising a mixture of (a) Portland cement, (b) an aggregate, (c) from about 1 to about 3 parts by weight of calcium chloride, (d) from about 0.4 to about 2 parts by weight of naphthalene sulfonic acid formalin condensate, (e) from about 1 to about 2 parts by weight of alkylcellulose having a viscosity of about 4,000 cps, and (f) from about 2 to about 5 parts by weight of propylene glycol, all of said parts being based upon 100 parts of said Portland cement, and said aggregate being present in an amount of from about 100 to about 150 parts by weight.

9. The method of claim 8, which includes adding a synthetic rubber latex in the pasty paint composition.

10. The method of claim 8, which includes adding a vinyl resin emulsion in the pasty paint composition.

* * * * *